Sept. 19, 1961 J. M. MILAN 3,000,470
WATER COOLED, DISC TYPE BRAKE ASSEMBLY
Filed Jan. 7, 1959 5 Sheets-Sheet 1
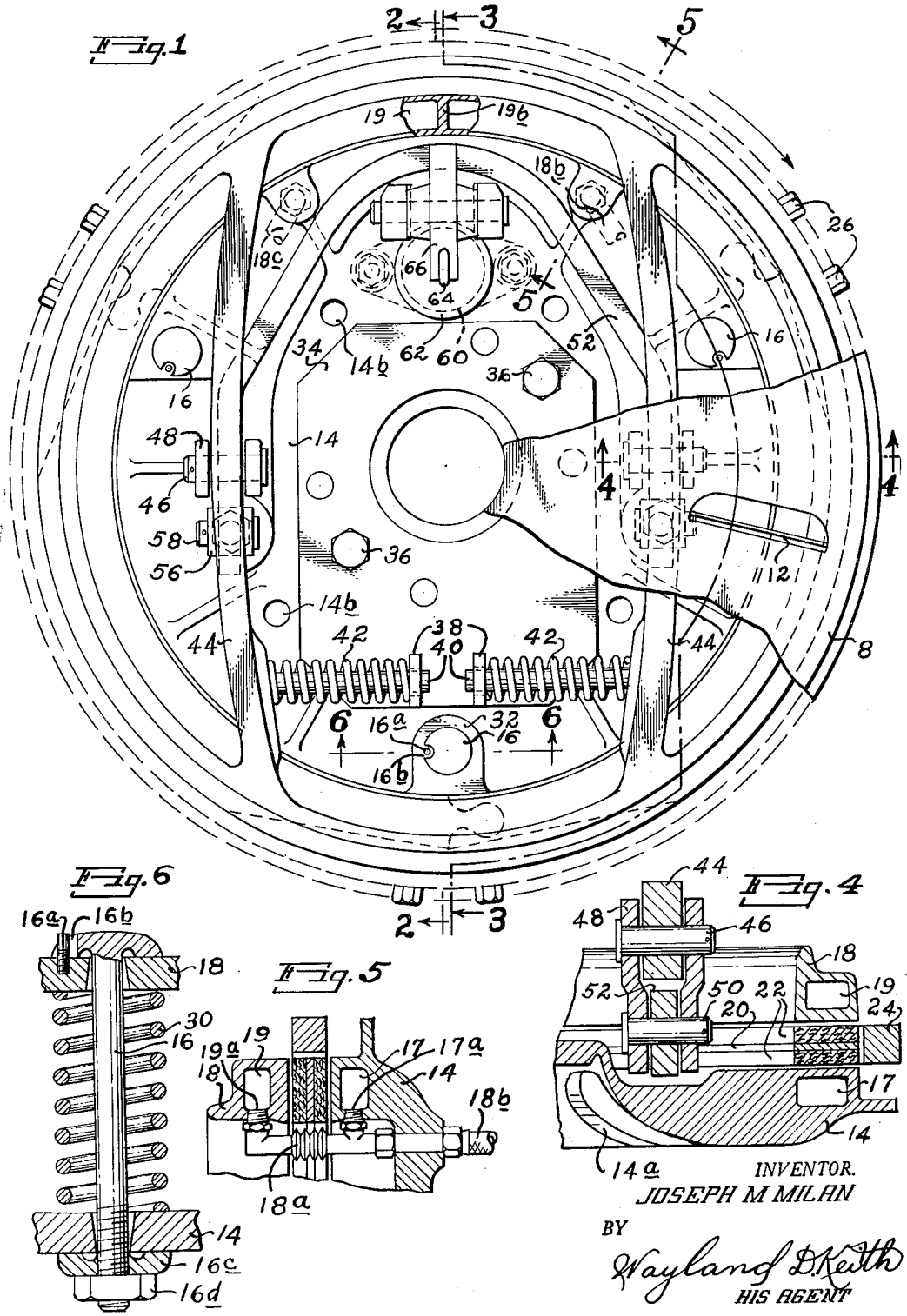
INVENTOR.
JOSEPH M MILAN
BY
Wayland D Keith
HIS AGENT

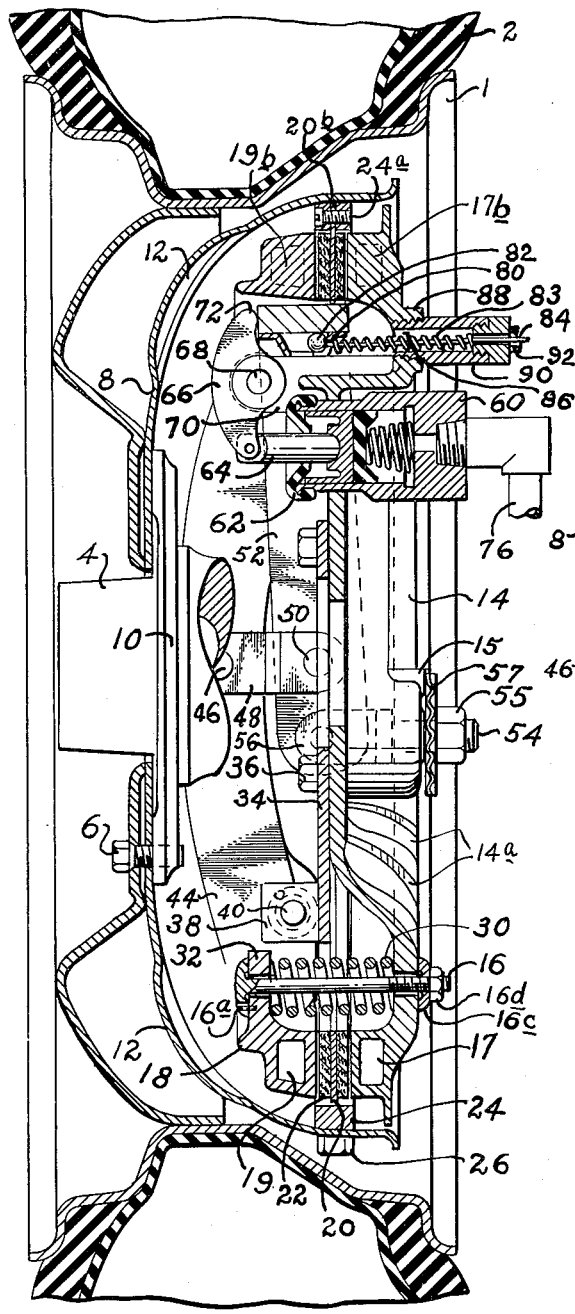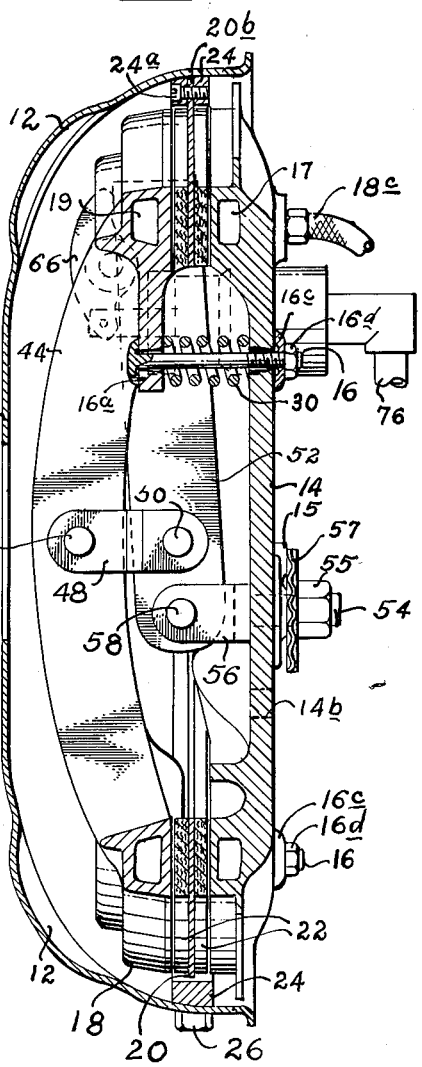

Sept. 19, 1961 J. M. MILAN 3,000,470
WATER COOLED, DISC TYPE BRAKE ASSEMBLY
Filed Jan. 7, 1959 5 Sheets-Sheet 3
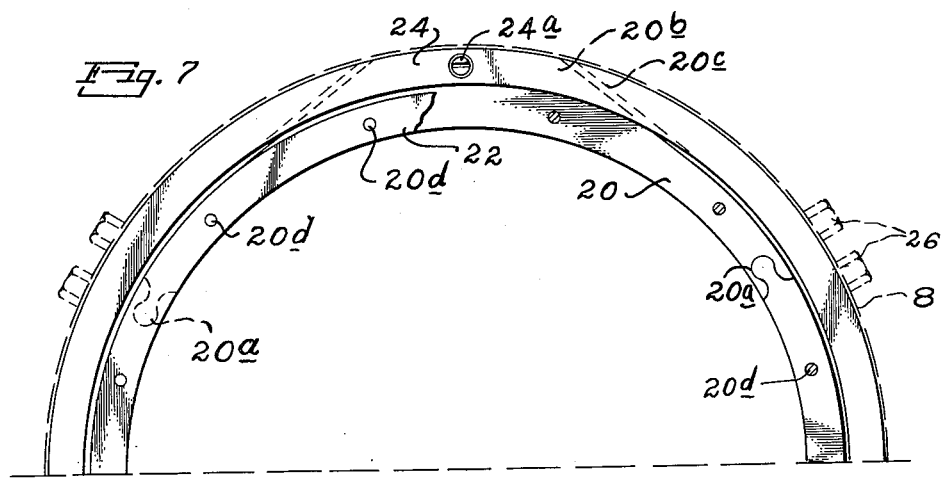
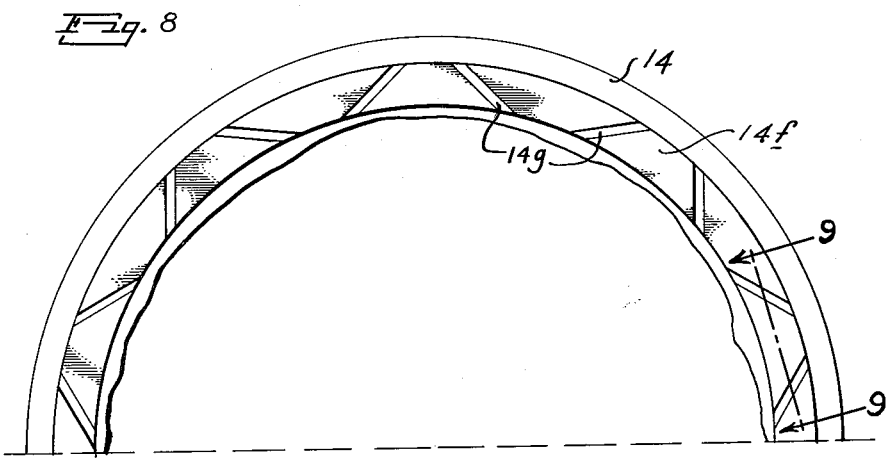
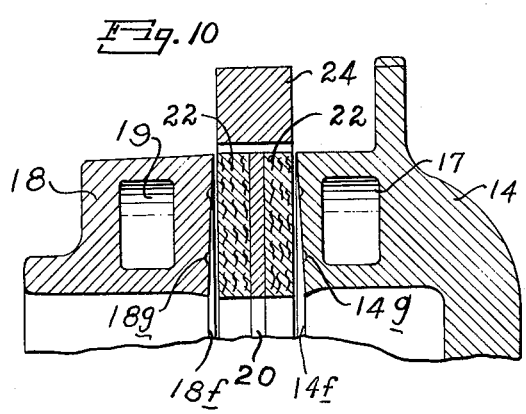
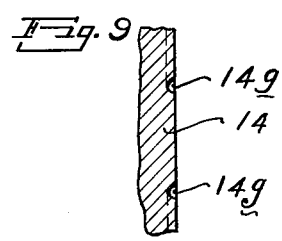
INVENTOR.
JOSEPH M MILAN
BY
Wayland D. Keith
HIS AGENT

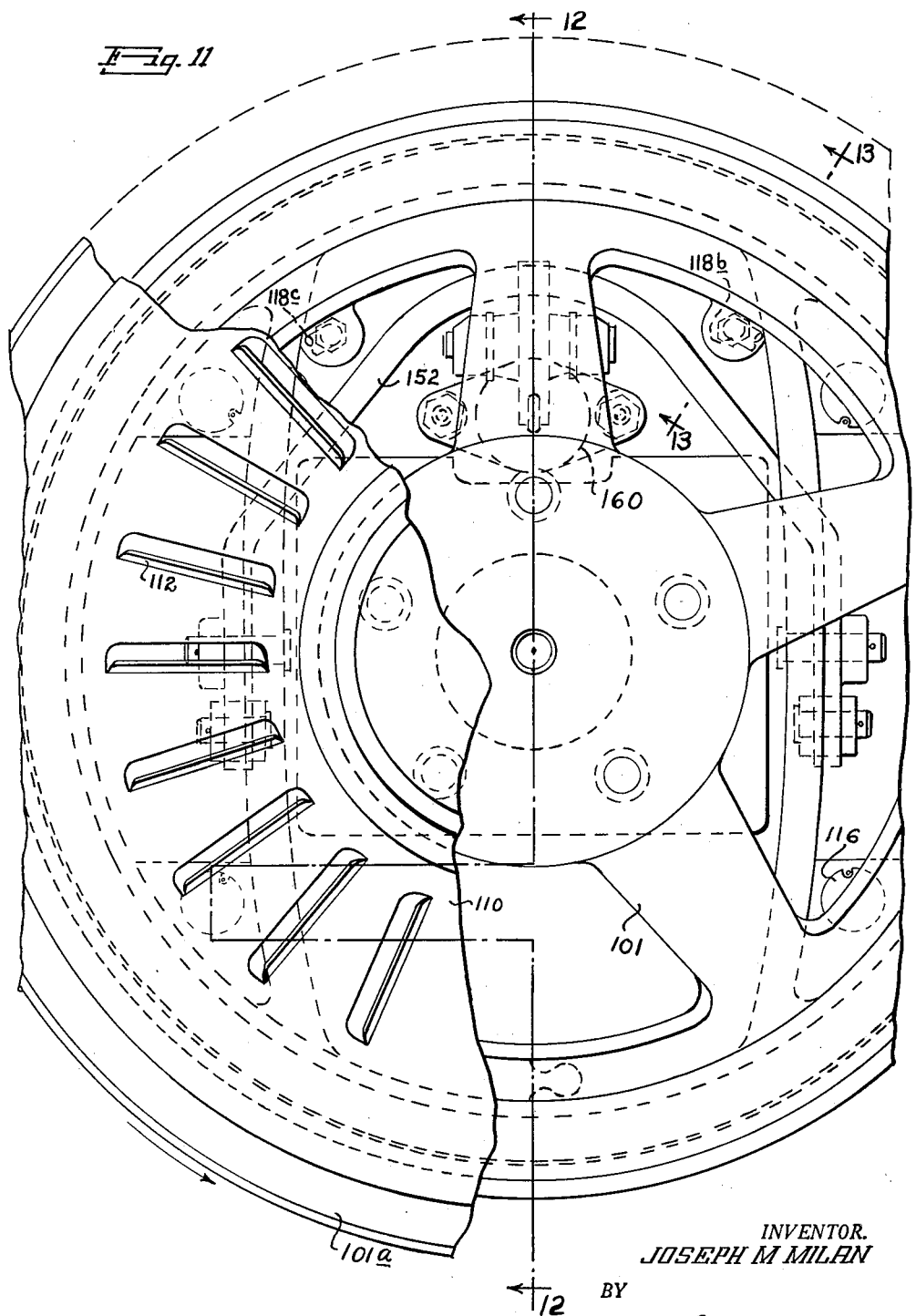

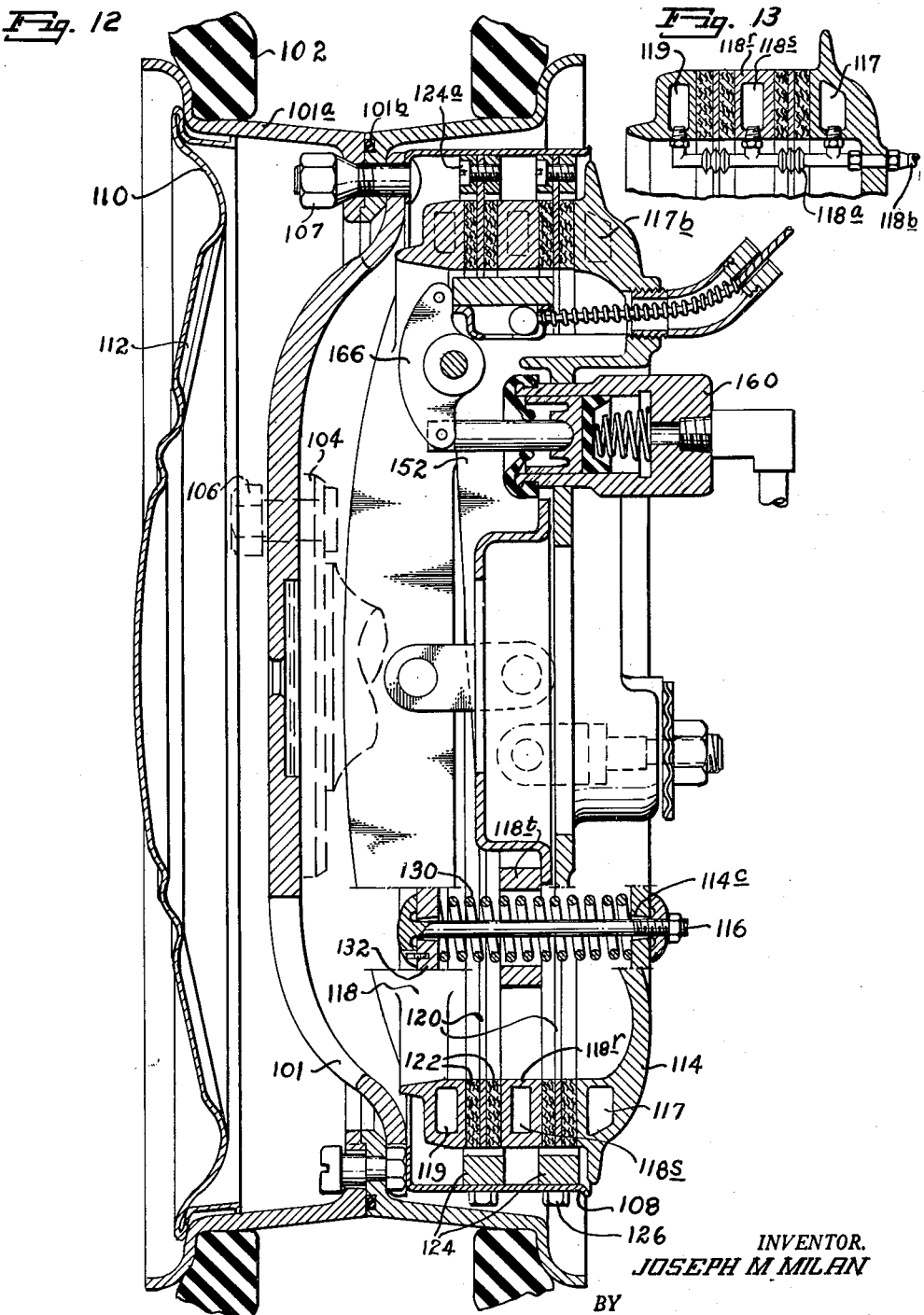

United States Patent Office 3,000,470
Patented Sept. 19, 1961

3,000,470
WATER COOLED, DISC TYPE BRAKE ASSEMBLY
Joseph M. Milan, Rte. 2, Sayre, Okla.
Filed Jan. 7, 1959, Ser. No. 785,345
5 Claims. (Cl. 188—72)

This invention relates to improvements in brakes and more particularly to disc brakes, and the manner of adjusting and equalizing the friction elements thereof with respect to the friction engaging elements.

Various brakes have been proposed heretofore, and although some of these were excellent, when new and properly adjusted, an improper adjustment might cause them to fail or to be inadequate in times of emergency. The present brake is constructed in such manner as to make it dependable over long periods of time, and over great driving distances, when used on a car or the like, and which, when once adjusted, will maintain the adjustment for thousands of miles.

An object of this invention is to provide a brake which will give the maximum of service with the minimum of attention.

Another object of the invention is to provide a friction engaging element on the wheel of a vehicle, which will readily dissipate the heat produced by the engagement of the friction element with the friction engagement member.

Still another object of the invention is to provide an adjustment means which will normally maintain the friction engaging element a spaced distance from the friction element.

Still a further object of the invention is to provide a self-contained brake for use in vehicle wheels, which brake may be remotely actuated, as by hydraulic means.

A yet further object of the invention is to provide a friction brake of the disc type, wherein a liquid cooling medium, such as water, maintains the interengaging elements cool at all times.

Yet another object of the invention is to provide a disc brake which may be selectively operated by a cable.

A still further object of the invention is to provide a brake system whereby heated air, which surrounds the brake, is drawn outward by suction.

Another object of the invention is to provide a brake that is simple in construction, easy to adjust and which has long wearing qualities.

With these objects in mind and others which will become manifest as the description proceeds, reference is to be had to the accompanying drawings in which like reference characters designate like parts in the several views thereof, in which:

FIG. 1 is an elevational view of a brake hub and brake shown apart from a vehicle, with parts being broken away to show the details of construction;

FIG. 2 is a sectional view taken on the line 2—2 of FIG. 1, looking in the direction indicated by the arrows;

FIG. 3 is a sectional view taken on the line 3—3 of FIG. 1, looking in the direction indicated by the arrows;

FIG. 4 is a detailed, cross-sectional view taken on the line 4—4 of FIG. 1, looking in the direction indicated by the arrows;

FIG. 5 is a fragmentary view showing a representative manner of connecting the conduits for conveying the coolant to the backing plate and to the friction engaging element;

FIG. 6 is an enlarged, fragmentary, sectional view taken on the line 6—6 of FIG. 1, looking in the direction indicated by the arrows;

FIG. 7 is a fragmentary elevational view of the friction element and an annular ring for supporting the disc element;

FIG. 8 is a fragmentary elevational view of the face of the backing plate;

FIG. 9 is a fragmentary sectional view taken on the line 9—9 of FIG. 8, looking in the direction indicated by the arrows;

FIG. 10 is an enlarged fragmentary sectional view of a portion of the backing plate friction disc elements and friction engaging element or pressure plate, and showing an exaggerated bevel face on the backing plate and on the friction element;

FIG. 11 is a fragmentary elevational view, with parts broken away, of a modified form of the invention;

FIG. 12 is a sectional view taken on the line 12—12 of FIG. 11, looking in the direction indicated by the arrows; and FIG. 13 is a sectional view taken on the line 13—13 of FIG. 11, looking in the direction indicated by the arrows.

With more detailed reference to the drawing, the numeral 1 designated a vehicle wheel having the usual pneumatic tire 2 thereon. The wheel 1 is secured through connecting means to a hub 4 by means of screw bolts 6, so the hub 4 and the wheel 1 will rotate in unison. The hub 4 may be secured to a wheel supporting member in the form of either an axle to which the hub is keyed for rotation therewith or mounted on a spindle for free rotation thereon, in a manner well understood in the art of vehicle wheels. A housing or casing 8 is secured intermediate the wheel 1 and an out-turned flange 10 on hub 4, which housing has circumferentially spaced louvers 12 therearound for directing air through the housing 8. A backing plate 14 is secured to a stationary object, such as an axle flange on a vehicle spindle or a flange on the axle housing of a vehicle, so as to maintain the backing plate in fixed relation with respect thereto.

The backing plate 14 has transverse bolts 16 passing therethrough and through a friction engaging element or ring 18. The backing plate 14 and the friction engaging element 18 are each substantially annular in shape and each has a cored passage 17 and 19 respectively, formed therein, which passages extend throughout the greater part of the circumference of the respective members, for the passage of a coolant fluid, such as water, therethrough to maintain the braking surfaces cool. The respective inlet openings 17a and 19a are formed adjacent each other so that a flexible conduit 18a, such as an accordion type, flexible metal hose or a rubber hose may connect openings 17a and 19a together with the conduit 18b leading to a source of cooling liquid, which cooling liquid is supplied under pressure. Respective walls 17b and 19b close the respective passages 17 and 19, which are formed in the respective members 14 and 18 at a point within the circumference, with the inlet openings 17a and 19a being on one side of the wall and similar outlet openings (not shown) being on the opposite side of the respective walls, which walls form a block, so as to direct cooling fluid or liquid around the major portion of the respective annular members 14 and 18, which cooling liquid passes out through the outlet openings into conduit 18c, which is similar in construction to the conduit as shown in FIG. 5. The conduit 18c leads to a reservoir (not shown) for cooling and recirculation.

Radial ribs 14a are formed in backing plate 14, at spaced intervals therearound, as best seen in FIG. 4, to provide additional radiation surface from which heat, generated by the friction elements of the brake, may radiate. Air inlet holes 14b are provided in backing plate 14, which enable air to be drawn into housing 8 by the suction created by louvers 12, which louvers form an exhaust fan to direct air through the housing to cool the friction engaging elements of the brake.

In event a flexible metal conduit is used, it may be fitted into the respective openings 17a and 19a and silver soldered, or otherwise secured in place, so that the cooling liquid will pass through conduits 18b into flexible fitting 18a, thence into openings 17a and 19a respectively, and since the respective walls 17b and 19b direct the cooling liquid around the greater part of the circumference of the respective members 14 and 18, before it is discharged through the openings on the opposite side of the respective walls, into the discharge conduit 18c, and since the annular members 14 and 18 are non-rotatable with respect to the axle mounting, rotating glands are not required to cool these braking elements, yet the flexible connection 18a permits movement of the friction engaging ring 18.

The friction engaging element 18 and the backing plate 14 are spaced apart with the adjacent faces thereof being slightly beveled, as shown greatly exaggerated in FIG. 10, and with the respective beveled faces sloping inwardly toward the center, the peripheral edges of the respective members 18 and 14 will engage the peripheral edge of the element 22 first. These bevel faces are indicated at 18f and 14f respectively. On an annular friction engaging face of approximately one inch in face width, it is preferable to have the bevel from .002 to .004 of an inch less on the inner edge of the respective faces than on the outer edge thereof, depending on the material used. Since the initial engagement will be with the outer edges of the friction element 22, as pressure is applied to friction engagement element 18, because of the resiliency of the metal thereof, there will be a slight yielding of the complementary elements, which will cause a face area to engage in proportion to the amount of pressure applied. This will give a "feathering" action to the brake, that is, the brake will engage from the most minute touch, up to the maximum braking which can be accorded without locking the wheels. Therefore, with this control in applying the brake, it is not necessary for the operator to lock the wheels, which could cause dangerous skids, or the lessening of the coefficient of friction between the tire and the tire engaging surface, such as road pavement.

The disc element 20 is preferably made in three arcuate sections which have complementary, interlocking tongue and groove connections 20a to interlock the three arcuate sections together to form a substantially annular ring, which annular ring has lugs 20b spaced mediate tongue and groove elements 20a. A ring 24 has internally milled slots 20c at spaced points therearound, which slots complementally receive the respective lugs 20b therein. However, since the internal diameter of ring 24 is less than the external diameter of annular disc element 20, at the points where the lugs 20b are present, it is necessary to put the segments of the disc element 20, which forms an annular ring, into the ring 24 one segment at a time, so that the lugs 20b will pass out through milled slots 20c. However, when the last of the segmental portions of the annular ring is being put into place, it is necessary to distort the segments of the disc element 20, by applying a slight twisting action until the remaining tongue and groove connection 20a goes into interlocking relation, whereupon, the disc element 20 will remain in place, unless the segments thereof are distorted in a reverse manner to remove the tongues from the grooves of the segments. After the segments are in place, screws 24a are passed transversely through ring 24 and through an aperture in each lug 20b so as to secure the lugs 20b in fixed relation with respect to ring 24. With the disc element 20 secured in place, annular friction elements 22, which are made of asbestos, asbestos composition, or other suitable material, are fixed on each side of disc element 20 and rivets 20d are passed therethrough and through complementary apertures within disc element 20. The annular ring 24, disc element 20, and friction elements 22 are secured to the housing 8 by screw threaded bolts 26, which bolts pass through the housing 8 and are screw threaded into annular ring 24.

The wheel 1 is mounted for rotation about the axis thereof in such manner that the disc element 20 and friction elements 22 will rotate between the beveled faces of backing plate 14 and friction engaging element 18, as springs 30 are telescoped over the bolts 16 to maintain these two elements apart, and out of binding engagement with the friction elements 22.

The bolts 16, which pass through friction engaging element 18 and backing plate 14, have relatively large, flat heads and similarly shaped nuts, which engage flat faces on the backing plate 14 and friction engaging element 18, respectively. The holes which receive the bolts are of a size to allow the bolts to pass loosely therethrough, and preferably have inversely coned holes to permit a limited lateral movement of the bolts 16 in the respective holes, which in turn will cause a leverage action of the head of the bolt and the nut of the bolt with respect to the backing plate 14 and friction engaging element 18, respectively. A dowel pin 16a passes through a slotted opening 16b in the head of each bolt 16, which dowel pins are screw threaded or otherwise secured in friction engaging element 18. A nut 16c is screw threaded onto each bolt 16 so as to provide the proper adjustment of the friction engaging element 18 with respect to backing plate 14. A lock-nut 16d is provided on each bolt 16 to lock nut 16c in adjusted position. The heads of the respective bolts 16 are in bearing relation with the inwardly extending lugs 32 on friction engaging element 18, as will best be seen in FIGS. 1, 2 and 6. Since the heads and nuts of the bolts 16 are relatively large and flat, when the brake is engaged, a limited rotary movement will be imparted to friction engaging element 18, and as the friction engaging element rotates a few degrees with respect to the backing plate 14, bolts 16 are canted, which will cause faster engagement or self-energizing engagement of friction engaging element 18 with the friction elements 22. However, upon release of pressure from the friction engaging element 18, the bolts will move the element 18 back to centered relation with respect to plate 14, so as to give maximum release of the brake.

A plate 34 is bolted to backing plate 14 by means of bolts 36 and is in fixed relation with respect thereto, and has a pair of lugs 38 thereon, which extend outwardly therefrom, and which lugs have apertures formed transversely therethrough to receive pins 40, as will best be seen in FIGS. 1 and 2. Springs 42 are positioned within housing 8 and are telescoped over pins 40 so the springs are in abutting relation, at one end, with the lugs 38, and at the other end they are in abutting relation with the inner faces of arms 44. The pins 40 are slightly smaller in diameter than the diameter of the apertures in lugs 38, thereby permitting a slight shifting action so as to center the arms 44 with respect to the center of brake engaging element 18.

The arms 44 extend transversely of the housing 8 and are made integral with friction engaging element 18. The arms 44 are each apertured mediate their ends to receive the respective pins 46 therethrough and through the respective clevises 48. The clevises 48 extend downward and are apertured to receive a pin 50 therethrough and through apertured fulcrum arm 52, as will best be seen in FIGS. 3 and 4. The apertured arm 52 has the ends thereof anchored by the respective adjustable clevis bolts 54, which are bifurcated to form clevises 56 through which the respective pins 58 pass. The pins 58 also pass through the respective ends of apertured fulcrum arm 52. The fulcrum arm 52 extends upward to form a U-shaped member, as will best be seen in FIG. 1.

A hydraulic power cylinder 60 is mounted in backing plate 14 and has the greater portion of the length thereof extending to the outside of the backing plate 14 so as to be exposed to the open air for cooling. The inner end of the cylinder 60 has conventional seals 62 thereon, through which a push rod 64 passes. The push rod 64 is pivotally connected to a rocker lever 66 which is pivotally mounted on a pin 68 which passes through apertured lugs 70, which lugs 70 are also mounted on backing plate 14.

The opposite end of the rocker lever 66, from the pivoted connection with the push rod 64, is rounded, as indicated at 72, and is in bearing relation with fulcrum arm 52 mediate the ends thereof, so upon application of hydraulic pressure to cylinder 60, through conduit 76, which conduit 76 is connected to a source of hydraulic pressure, the piston within the hydraulic cylinder, will move the push rod 64 outward to rock the rocker lever 66 about the axis 68 thereof, which, in turn, will move the fulcrum arm 52 downward with great force. However, the lever advantage of the fulcrum arm is multiplied to draw clevises 48 downward with increased power, which in turn, will draw arms 44 and friction engaging element 18 into engagement with friction members 22 to bindingly engage the friction members and friction disc 20 in proportionate relation to the amount of hydraulic pressure applied to conduit 76, which determines the smoothness of the braking action of the device.

A nut 55 is provided on each of the clevis bolts 54 to provide for tightening these bolts so as to adjust the relative position of the fulcrum arm 52 with respect to the backing plate 14. A fluted washer 57, of conventional design, is interposed between the respective nuts 55 and packing plate 14, so a notched segment 15, on the backing plate 14, will engage the flutes of the washer, to prevent the adjustment of the fulcrum arm from becoming loosened.

Since the axial movement of the friction engaging element 18 is relatively small, a greater leverage power with little movement can be obtained between the hydraulic cylinder 60 and the bevel faces of the respective members 14 and 18, which engage the friction element 22. In this manner, very little movement is required to apply the brake or to lock the wheels, in event the device is used on a vehicle. By having the friction elements 22 double faced, a relatively great friction contact area will be had on the annular ring 20, which enables a more compact brake unit to be had.

An apertured lug 80 is made integral with the fulcrum arm 52 mediate the ends thereof, which apertured lug has a spherical seat to complementally receive ball 82 therein. A cable 84 is fixedly secured to ball 82 and passes loosely through the aperture in lug 80 and out through a hole 86 in backing plate 14. It is preferable to have a screw threaded element 88 on backing plate 14 to threadably receive the threaded connector 90 for connecting cable housing 92 thereto. The cable 84 extends to an operator position in a vehicle or the like, and may be attached to a power actuator, such as a brake lever or the like, so upon movement of cable 84, by the cable actuator (not shown), the end of the fulcrum arm 52 will be moved toward backing plate 14 to enable the manual engagement of the brake, which actuator may have a holding arrangement, such as a ratchet and pawl, which arrangement is commonly known as an emergency brake, so as to maintain the brake in locked position.

It is preferable to have the effective cross-sectional area of the hydraulic pistons of the respective hydraulic cylinders 60, of such size that, when coupled through the respective leverages, to the pressure plate, the pressure on the friction elements can be so controlled as to obtain the maximum torque of braking the wheels, which gives faster deceleration of a vehicle on which the brakes are mounted.

It is also preferable to utilize an aluminium alloy for the pressure plate and for the backing plate, which will readily dissipate the heat. The conduit 17 in the backing plate 14 and the conduit 19 in the pressure plate 18 may be a pipe cast into the aluminium alloy, to insure proper coring.

Modified form of disc brake

A modified form of the invention, as shown in FIGS. 11 through 13, embodies basically the same elements as the invention shown in FIGS. 1 through 10. However, the present form of the invention utilizes multiple plates or disc elements on which friction elements are mounted, which multiple plates gives greater frictional contact area between the stationary and rotating members, thereby decreasing the wear on the friction elements and providing greater frictional contact surface, to enable the rotation of the wheel to be retarded more quickly. The braking elements, in this form of the invention are cooled both by liquid and by air, as will be more fully brought out hereinafter.

In the present form of the invention the numeral 101 designates generally a wheel of an automotive vehicle, which wheel has a pneumatic tire 102 thereon, the wheel being secured to a conventional hub 104 by means of bolts 106. Bolts 107 secure a rim 101a, which rim is medially split, to the wheel 101. The rim 101a is indicated as having sealing element 101b mediate the portions thereof, which sealing element 101b may be in the form of an O-ring which is adapted to fit within a recess formed in one of the rim elements, as will best be seen in FIG. 12. A housing 108 is also secured to wheel 101 and extends inward to enclose the brake mechanism around the periphery thereof in a manner which will be brought out more fully hereinafter.

A casing 110 is provided on the outer side of the wheel, in which louvers 112 are formed at circumferentially spaced intervals, the outstanding lips of which louvers are so formed as to normally rotate in a manner to draw the hot air from within the inner portion of the wheel outward, and to cause air to circulate through housing 108 and around the various friction engaging elements forming the brake. A backing plate 114 is fixedly secured to a flanged plate on the spindle, if a front wheel brake, or on the housing, if a rear wheel brake, in a manner similar to that shown in FIG. 1. The backing plate 114 has a passage 117, which may be cored or formed by a conduit, secured therearound, as shown in FIGS. 12 and 13, with the exception of a block or wall 117b. While the passage 117 is shown to be cored, it is to be understood that other expedients for forming the passage may be employed, such as a tubular element being secured thereto by welding or the like. The passage 117 has a block or wall 117b therein, which is similarly disposed to the wall 17b, shown in the form of the invention illustrated by FIGS. 1 through 10. A fluid inlet conduit 118b is connected with the passage 117 on one side of the block or wall 117b and a fluid outlet conduit 118c is connected to the passage 117 on the opposite side of block or wall 117b, so as to allow water to circulate through the cored passage 117.

The mounting or backing plate 114, for all general purposes of description, is the same as the backing plate 14, as shown in the form of the invention illustrated in FIGS. 1 through 10.

A friction engaging element or pressure plate 118 is formed of a substantially annular ring, which has cored passage 119 formed therearound, which is similar to passage 19 in the above described form of the invention. The mechanism for operating the friction engaging element 118 is substantially the same as the mechanism shown in FIGS. 1 and 2 and described above. However, the present brake differs from the above described brake in that a mediate, non-rotatable ring 118r is mounted mediate the backing plate 114 and the friction engaging element 118. Disc elements 120, on which annular friction elements 122 are mounted, are secured within annular rings 124 by screws 124a, in a manner similar to that set forth in the above described form of the invention. These friction elements 122 are so positioned as to have the lateral exterior faces thereof in engagement with the faces of the backing plate 114, friction engaging element 118, and with a double faced, non-rotatable ring 118r, which ring has a cored passage 118s formed therein, for the passage of a cooling liquid therethrough, in a manner similar to that shown for friction engaging element 118.

A flexible inlet conduit and a flexible outlet conduit are connected to the respective passages 117, 118s and 119 so as to permit relative axial movement of friction engaging element 118 and double faced, non-rotatable ring 118r.

A spring 130 is telescoped over each of the elongated bolts 116, which bolts pass through lugs 132 on friction engaging element 118 and through lugs 118t on non-rotatable ring 118r, and through holes 114c formed in backing plate 114. The head of each bolt 116 is of the same character as that of bolt 16 and is maintained against rotation by means of a dowel pin fitted within a slot, as set out for the form of the invention described above. Each of the lugs 118t has a hole therethrough of sufficient size to allow a spring 130 to pass through, which holes are of sufficient size to permit a slight biasing of bolt 116 and spring 130 and yet are not large enough for the bolt and spring to become fouled, thereby allowing the ring 118r to quickly move back into centered relation with respect to friction elements 122, upon release of springs 130.

A hydraulic cylinder 160 extends through backing plate 114, as will best be seen in FIG. 12, and operates a rocker lever 166 to move fulcrum arm 152, which fulcrum arm 152 is connected to friction engaging element 118 in powered relation to draw the friction engaging element 118 into binding engagement with the adjacent face of one of the friction elements 122, which, in turn, will move the friction element 122 against the tension of compression springs 130 and into contact relation with one of the faces of non-rotatable ring 118r. As the friction engaging element continues to move, the opposite face of non-rotatable ring 118r will come into contact frictional engagement with a face of the other of the friction elements 122. A friction element is mounted on each side of the annular disc elements 120, which annular disc elements are resiliently constructed to permit sufficient yielding to enable the second friction engaging element 122 to move into contact frictional engagement with the face of backing plate 114, whereupon, braking action of any desired degree may be had.

As soon as the pressure is released from the hydraulic cylinder 160, the springs 130 will move the friction engaging element 118 out of contact relation with the frictional faces 122 and the annular disc elements 120 are so spaced, that the outermost annular disc element will move out of contact relation with the face of ring 118r, which will leave the ring 118r free to float on springs 130, without being forced into frictional contact with either of the adjacent faces of friction elements 122. The rings 124 are held in place within housing 180 by bolts 126, which are similarly spaced to the bolts 26, shown in the form of the invention previously described.

It is preferable to have the same type bevel faces on backing plate 114, as shown in FIG. 10. The friction engaging element 118 and non-rotatable ring 118r are similarly beveled, so that the periphery of the annular friction element will be engaged with the respective adjacent faces of the non-rotatable elements, with the faces thereof being angularly grooved, substantially as shown in FIGS. 8 and 9, which grooving provides means for cleaning the faces of the friction elements 122 so they will be free of mud, water, grit or other foreign matter, thereby presenting a clean braking surface at all times.

It is to be pointed out that the tongue and groove connections, such as shown at 20a, FIG. 7, are also present in the present form of the invention, which permits the disc element 120 to be yieldable, which construction also prevents chattering, which would occur with an integral annular ring, due to distortion caused by heat. The present form of the invention utilizes four of the adjustment bolts 116, however, the leverage presented by the heads and the nuts of the respective bolts is such as to bring the friction engaging element 118 and the non-rotatable ring 118r back into centered relation with respect to the friction elements 122, without the use of springs, as shown at 42 in FIG. 1.

While the invention has been described and illustrated in some detail in the two embodiments thereof, it is to be understood that changes may be made in the minor details of construction and adaptations made to different installations without departing from the spirit of the invention or the scope of the appended claims.

Having thus clearly shown and described the invention what is claimed as new and desired to be secured by Letters Patent is:

1. A brake construction comprising; a non-rotatable backing plate, and a friction engaging element, a housing surrounding said backing plate and said friction engaging element, an annular ring within said housing, an annular friction disc secured to said ring and mounted between said backing plate and said friction engaging element, operating means for moving said friction engaging element toward said backing plate, means for resiliently stabilizing said friction engaging element with respect to said backing plate, at least two upstanding members secured in fixed relation relative to said backing plate, and spring elements interposed between said upstanding members and said friction engaging element.

2. In a disc brake, a hub, a housing secured to the hub, a ring positioned within the housing and secured thereto and having a plurality of circumferentially spaced radially extended slots, an annular disc comprising a plurality of circumferentially spaced interlocked segments, a radially extended lug carried by each disc segment and adapted to project into one of the circumferentially spaced radially extended slots formed in the ring, fastening means to secure together the disc segments and ring in the area of the radially extended lug, friction braking means carried by the disc segments, non-rotatable annular backing plate and annular engaging ring members positioned on opposite sides of the annular disc, yielding means urging the annular engaging ring away from the backing plate, and linkage means to move the annular engaging ring toward the backing plate to engage the friction braking means carried by the annular disc.

3. In a fluid cooled disc brake, a wheel supporting member, a hub adapted to be secured to the wheel supporting member, a wheel, detachable connecting means to secure the wheel to the hub, a housing secured to the hub, a ring positioned within and secured to the housing, an annular disc mounted within the ring and comprising a plurality of circumferentially spaced segments, tongue and groove locking means between the circumferentially spaced segments of the disc, radially extended lugs carried by the disc segments, fastening means projecting through said ring and engaging the lugs of said segments to secure the disc segments to the ring, friction braking means carried by segments of the annular disc member, an annular disc member, a stationary member, an annular backing plate secured to the stationary member and having a surface adapted to engage the friction braking means, an annular engaging ring spaced from the backing plate and having a surface adapted to engage said friction braking means, yielding means urging the annular engaging ring and the backing plate apart, linkage means to move the annular engaging ring toward the backing plate to engage the friction braking means associated with the annular disc, motion transmitting means to actuate the linkage means, circumferentially extending fluid conducting passageways in the backing plate and in the annular engaging ring, adjacently positioned fluid conducting inlet and outlet passages connected with said cored passages to direct cooling fluid through said passageways around substantially the entire circumference of said backing plate and annular friction engaging ring, and means to circulate cooling fluid through said passageways to dissipate heat from the backing plate and annular engaging ring.

4. In a disc brake for a vehicle wheel having a rotatable hub and a housing secured to the hub the combination thereof of a ring secured within the housing and having a plurality of circumferentially spaced radially extended slots and a disc comprising a plurality of circumferentially spaced interconnected segments each having a radially extended lug adapted to project into one of the circumferentially spaced radially extended slots formed in the ring, and fastening means to secure together the disc segments and ring in the area of the radially extended lug.

5. A ring and friction element of a disc brake for a vehicle wheel having a rotatable hub and a housing secured to the hub, comprising a ring positioned within the housing and secured thereto and having a plurality of circumferentially spaced radially extended slots formed therein, a disc having a plurality of circumferentially spaced interconnected segments each having a radially extended lug adapted to project into one of the circumferentially spaced radially extended slots formed in the ring, and fastening means projecting through the ring in the area of the radially extended lugs to secure together the disc segments and the ring.

References Cited in the file of this patent

UNITED STATES PATENTS

| | | |
|---|---|---|
| 1,831,125 | Lambert | Nov. 10, 1931 |
| 2,057,796 | Shelor | Oct. 20, 1936 |
| 2,127,557 | Ells | Aug. 23, 1938 |
| 2,177,372 | Milan | Oct. 24, 1939 |
| 2,237,624 | Oldham | Apr. 8, 1941 |
| 2,266,059 | Milan | Dec. 16, 1941 |
| 2,331,259 | Whitten | Oct. 5, 1943 |
| 2,366,093 | Forbes | Dec. 26, 1944 |
| 2,654,448 | Benson | Oct. 6, 1953 |
| 2,664,176 | Whalen | Dec. 29, 1953 |
| 2,757,761 | Milan | Aug. 7, 1956 |